United States Patent [19]

Hogg et al.

[11] 4,188,542
[45] Feb. 12, 1980

[54] MIRROR IMAGE ELLIPSOID RADIATION COLLECTOR AND METHOD

[75] Inventors: Walter R. Hogg, South Miami; Albert Brunsting, Miramar, both of Fla.

[73] Assignee: Coulter Electronics, Inc., Hialeah, Fla.

[21] Appl. No.: 899,583

[22] Filed: Apr. 24, 1978

Related U.S. Application Data

[63] Continuation-in-part of Ser. No. 888,566, Mar. 20, 1978, abandoned.

[51] Int. Cl.² .................. G01J 1/58; G01N 21/38; G01N 33/16
[52] U.S. Cl. .................. 250/458; 250/373; 250/461 B; 250/504; 356/39
[58] Field of Search .............. 362/301, 302, 304, 305; 313/111; 250/458, 461 B, 574, 504, 373; 350/293; 356/38, 39, 41, 42

[56] References Cited

U.S. PATENT DOCUMENTS

| | | | |
|---|---|---|---|
| 1,463,623 | 7/1923 | McCarthy | 362/302 |
| 3,494,693 | 2/1970 | Elmer | 362/302 |
| 3,946,239 | 3/1976 | Salzman et al. | 250/461 B |
| 3,989,381 | 11/1976 | Fulwyler | 356/36 |

Primary Examiner—Davis L. Willis
Assistant Examiner—Carolyn E. Fields
Attorney, Agent, or Firm—William A. Newton

[57] ABSTRACT

Disclosed is a radiation collector apparatus for analyzing particles by irradiating the particles to produce a source of detectable radiation, wherein the radiation collector apparatus comprises a reflector chamber having an ellipsoidal first reflector surface truncated in a plane of a minor axis of the same by a planar second reflector surface. Detectable radiation emanating from a primary focus of the first reflector surface either directly or after one or more reflections proceeds through a window formed in one of the reflector surfaces for subsequent processing. In another embodiment a dichroic second reflector surface is provided.

24 Claims, 4 Drawing Figures

MIRROR IMAGE ELLIPSOID RADIATION COLLECTOR AND METHOD

CROSS REFERENCE TO RELATED APPLICATION

This application is a continuation-in-part of an earlier filed application, Ser. No. 888,566, filed on Mar. 20, 1978 now abandoned.

FIELD OF THE INVENTION

The present invention is directed to the collection of detectable light signals radiating from individually isolated particulate material, such detectable light signals being used for the counting and analysis of particulate materials.

DISCUSSION OF THE PRIOR ART

The quantitative measurement, counting and analysis of cells and like particulate material have become very important parts of biomedical research. Various flow cytometers exist in the prior art and have been devised to measure a range of cellular substances and properties, with some of these properties having to be measured on a cell by cell basis. The flow cytometers were improved by incorporating a laminar sheath-flow technique, which confines cells to the center of a flow stream, and a laser beam for intersecting the cell flow, which produces scattered light from the laser beam and/or fluorescent light from stained cells when the laser beam is at the proper wave lengths. Prior to U.S. Pat. No. 3,946,239, to Salzman et al, the cytometers were inefficient in collecting the scattered and fluorescent light, which made it difficult or impossible, in some cases, to investigate weakly fluorescing dyes bound to cells and fluorescence from small particles. More specifically, when there is inefficient collection of light, measurements of weak signals are made difficult due to the poor signal to noise ratio. The efficiency of light collection was improved by the ellipsoidal reflection chamber of U.S. Pat. No. 3,946,239. As disclosed in "The Journal of Histochemistry and Cytochemistry", Volume 25, No. 7, page 784, the flow chamber of U.S. Pat. No. 3,946,239 collects about sixty percent of the total cell fluorescence. Although this particular device made an improvement in efficiency of collecting scattered light and fluorescence, there are several inherent problems still remaining with the prior art as it has progressed up to and through U.S. Pat. No. 3,946,239, as will be discussed below.

First, in U.S. Pat. No. 3,946,239, most of the light that proceeds past the second focal point of the ellipsoidal flow chamber without any reflection off the ellipsoidal surface is lost for the purposes of collection. More specifically, the utilization of the end of the ellipsoid flow chamber for the placement of the conical reflector decreases the total elliptical surface available for reflection and therefore decreases the collection angle and efficiency of the chamber. In addition, light reflecting off of the end of the ellipsoidal chamber converges at an extremely wide angle relationship relative to the center axis of the conical reflector, resulting in extremely inefficient use of the reflected light. Part of this inefficient use of light is due to multiple reflections of the light within the conical reflector. The decrease in collection angle and efficiency in turn makes the chamber more sensitive to asymmetric particle orientation in the flow system, as well as lessening the ability to analyze weak fluorescent particles.

Secondly, in U.S. Pat. No. 3,946,239, when the light that is converged at the second focal point of the ellipsoid chamber is collected by the conical reflector, the collected light is neither focused nor collimated and therefore arrives at the photosensitive measuring device in a disorganized manner at many different angles. The non-orthogonal approach of the collected light to the photosensitive measuring device reduces the efficiency of the photosensitive device and its filters in that such devices are best suited to light impinging orthogonally on their surfaces. Moreover, due to the light being disorganized, conventional means, such as lenses, for creating more orthogonal light cannot be used with the device of U.S. Pat. No. 3,946,237.

Thirdly, the orifice of the conical reflector of U.S. Pat. No. 3,946,239, which collect the light is sufficiently large to allow stray light to be gathered. This orifice must be larger than the sensing zone (intersection of stream of particles and the laser beam). Additional width to the orifice is required by the wide angle convergence of the light at the second focal point and the extreme eccentricity of the ellipsoidal chamber. In U.S. Pat. No. 3,946,239 a pinhole orifice would be extremely inefficient, in that positioning would be critical in three dimensions and, if it were not perfectly positioned, practically no light would pass therethrough. This is due primarily to the light approaching the pinhole at angles widely different from the normal.

The cytometer of U.S. Pat. No. 3,946,239, although having a relatively good efficiency, can be described as being partially "blind". In other words, if light emanating from a particle is highly concentrated in some preferred solid half-angle, there is a possibility that it could be missed entirely even though this collector is efficient. More specifically, many particles are not spherical, but behave as combinations of oddly shaped mirrors and lenses, and hence cause "hot spots" in which large percentages of available light are directed in preferred directions. Consequently, in that this prior art cytometer does not collect light from all possible directions and collects light extremely inefficienctly in other directions, there exists the possibility of "hot spots" being aimed at a "blind" region. The net result is that some of the particles will cause some unpredictable percentage of the light emanating from them to be collected. This will smear a histogram generated by plotting the number of particles of a given intensity versus that intensity to the left, since many of the particles will appear dimmer than they actually are. Discrepancies of this magnitude are important. For instance, it is desirable to distinguish cells with X chromosomes from those with Y chromosomes, but at the present state of the art this is not possible.

It should also be noted that with the more efficient gathering of fluorescence and scattered light, the less powerful the laser beam needs to be, therefore leading to cost savings.

Other relevant prior art includes U.S. Pat. No. 3,494,693 to Elmer which teaches the use of coincident axis for reflecting means in the emission of heat. In addition, U.S. Pat. No. 3,989,381 discloses an inefficient light collector.

Accordingly, it can readily be seen that there is a need in the industry for a cytometer which is more efficient in collecting scattered light and fluorescence, and is more efficient in impinging the collected light on the photosensitive detectors. This increase in efficiency can result in being able to detect signals not previously detectable above the noise, decreasing the impact of the shape and orientation of particulate matter in the flow stream by eliminating "blind" regions, and allowing for lower powered lasers.

SUMMARY

The present invention is directed toward a radiation collector apparatus and method wherein irradiation of particles produces a source of detectable radiation. The radiation collector apparatus comprises a reflector chamber having a half ellipsoidal first reflector surface and a planar second reflector surface. The first reflector surface has a primary focus and a secondary focus defining a symmetry axis with the primary focus being positioned at the source of detectable radiation. The secondary reflector surface is disposed between the primary focus and the secondary focus so that any point on the second reflector surface is equally spaced from the primary focus and the secondary focus. A window is formed in one of the reflector surfaces and is aligned in intersecting relationship with the symmetry axis. In operation the detectable radiation emanating from the primary focus proceeds, either directly or after one or more reflections off of the first reflector surface and/or the second reflector surface, through the window for subsequent processing and analysis. In another embodiment of the present invention a dichroic second reflector surface is provided.

BRIEF DESCRIPTION OF THE DRAWINGS

Further objects and advantages of the present invention will become apparent as the following description proceeds, taken in conjunction with the accompanying drawings in which.

DETAILED DESCRIPTION OF THE PREFERRED EMBODIMENT

Figure 1:
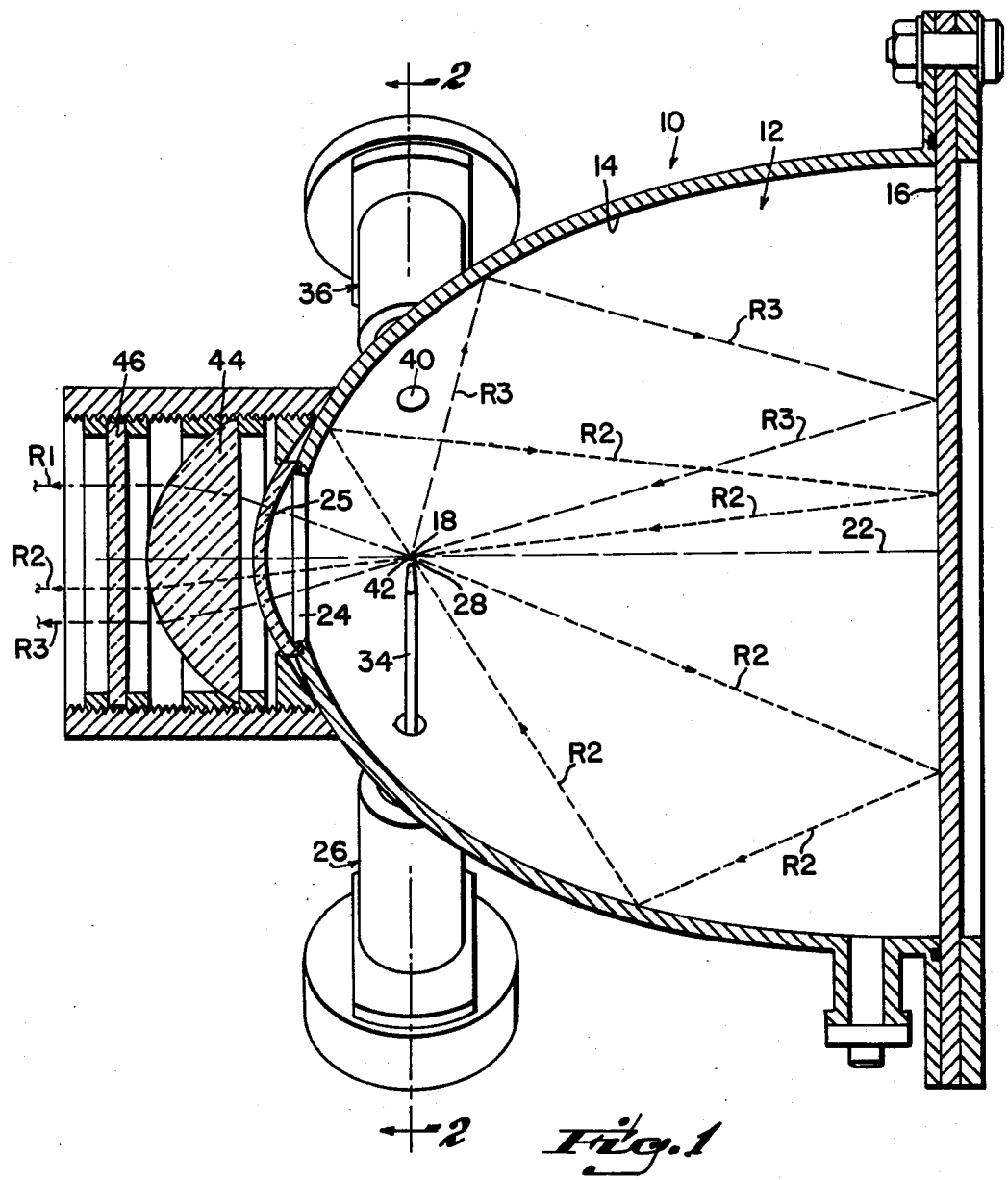
FIG. 1 is a cross-sectional view of the radiation collector apparatus of the present invention taken along a plane passing through the primary focus of the ellipsoidal first reflector surface as depicted by the sectional line 1—1 of FIG. 2.

Referring to FIG. 1, there is shown a radiation collector apparatus, generally represented by numeral 10, for collecting detectable radiation produced by irradiating individually isolated particulate material. The radiation collector apparatus 10 comprises a reflector chamber 12 having an internal first reflector surface 14 and an internal second reflector surface 16. As illustrated in FIG. 1, the first reflector surface 14 has the configuration of a half portion of an ellipsoid of revolution about the major axis. More specifically, every ellipse has a major axis and a minor axis. When the ellipse is terminated at its minor axis the resulting half ellipse portion defines an elliptical curve. The revolution of this elliptical curve about the major axis generates a half portion of an ellipsoid of revolution or, to describe it in another way, an ellipsoid of revolution truncated in a plane formed by all possible positions of the minor axis. Referring to FIG. 1, the first reflector surface 14 may be viewed as being truncated by or terminated with the second reflector surface 16. In that the second reflector surface 16 has a planar configuration, the same is substantially disposed in the plane formed by all possible positions of the minor axis.

Referring to FIG. 1, as with all ellipsoids of revolution or portions thereof, reflector surface 14 has a primary focus 18 and a conjugate secondary focus 20. Although the secondary focus 20 is not illustrated in FIG. 1, it is clearly shown in FIG. 3. The primary and secondary foci 18 and 20 define a symmetry axis 22. The symmetry axis 22 is substantially perpendicular to the second reflector surface 16 which is substantially equally spaced from the two foci 18 and 20. The reflector surfaces 14 and 16 enclose the primary focus 18, while the secondary focus 20 is situated exteriorly to the reflector chamber 12.

Generally, radiation emanating from one focus of an ellipsoid of revolution is reflected so as to converge toward the second focus. By placing the planar reflector surface 16 in a plane perpendicular to the major axis and containing the minor axis, the design of the reflector chamber 12 retains half of an ellipsoid of revolution and discards the remaining half. By virtue of this arrangement, the impact of the second reflector surface on the above described ray paths for an ellipsoid of revolution may be visualized as creating a mirror image of the first reflector surface so as to create an equivalently complete ellipsoid of revolution. More specifically, a ray reflected from the second reflector surface 16, proceeds within the half of the ellipsoid of revolution represented by the first reflector surface as if it was proceeding within the previously described discarded half of the ellipsoid of revolution. Consequently, a ray convergent upon the secondary focus 20, upon reflection from the seondary reflector surface 16, is convergent upon the primary focus 18. On the other hand, a ray proceeding toward a point of intersection on the previously described discarded half and which is not convergent upon the secondary focus 20, upon reflection from the second reflector surface 16, proceeds to impinge upon the first reflector surface at a point corresponding in position to the previously described point of intersection on the discarded half. Unless this ray passes through an opening or window 24, to be described hereinafter, the ray is reflected from the first reflector surface 14 so as to be convergent upon the primary focus 18. The specific ray patterns of the preferred embodiment will be clarified hereinafter.

As depicted in FIG. 1, the window 24 is formed in the first reflector surface 14 so as to provide an exit for radiation. The window 24 is preferably aligned to be centered on the symmetry axis 22. In the preferred embodiment a confining window glass 25, preferably having a spherical configuration, retains the fluid in the reflector chamber 12. Depending upon the usage of the reflector chamber 12 with aerosols or hydrosols, it may or may not be desirable to have the window glass 25. Preferably, the window glass 25 has an inner and outer radii thereof having a center at the primary focus 18 so as to allow the exiting radiation to pass orthogonally through its surfaces.

Figure 2:
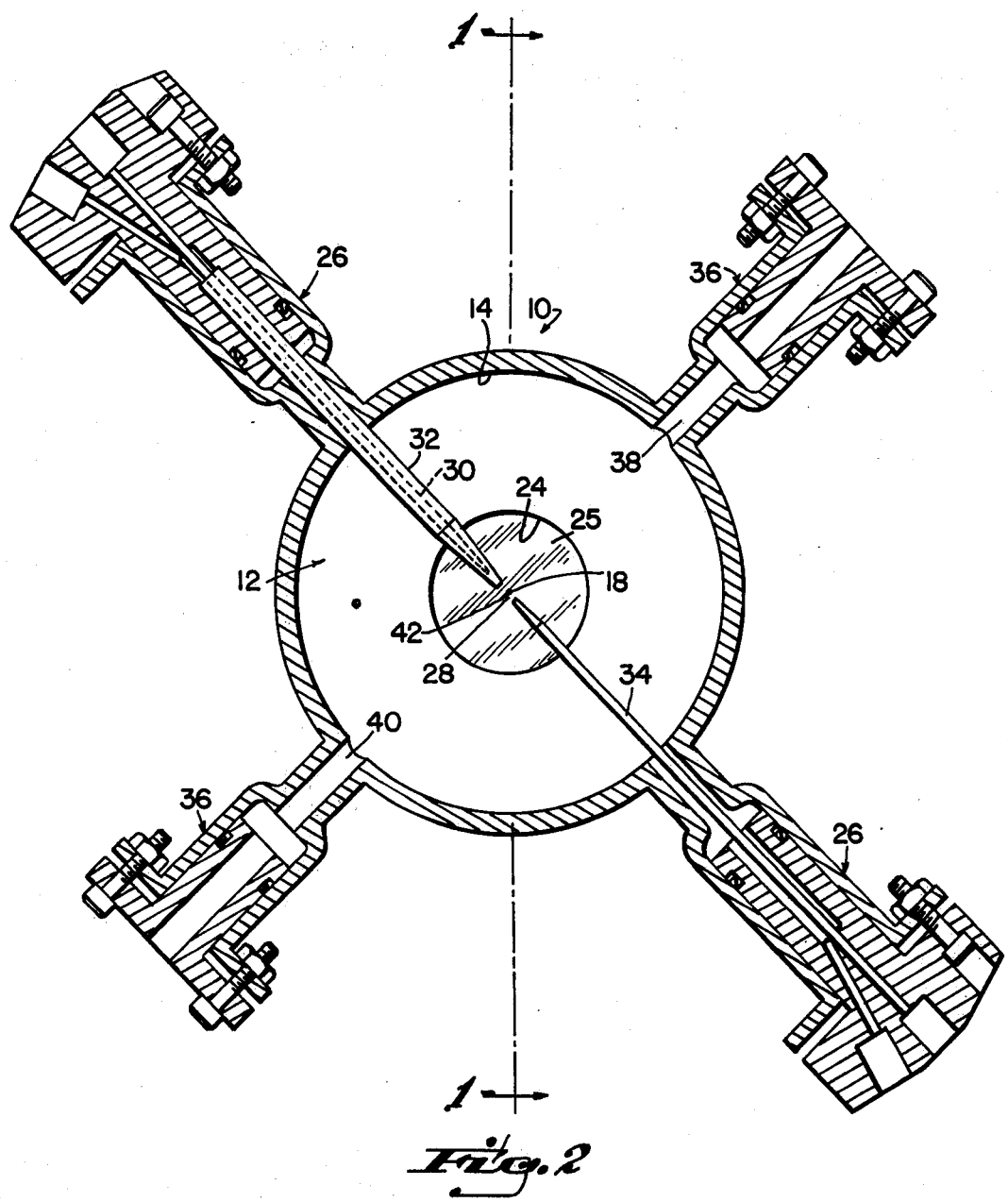
FIG. 2 is a cross-sectional view of the radiation collector apparatus of the present invention taken along a plane passing through the primary focus of the ellipsoidal first reflector surface as depicted by section line 2—2 in FIG. 1.

Referring to FIG. 2, means for entraining the particulate material through the primary focus 18 of the first reflector surface 14 is generally represented by reference numeral 26. The entraining means 26 provides for fluid transport of individually isolated particulate material in suspension through a measurement region 28. More specifically, in the preferred embodiment entraining means 26 includes an entrance tube 30 which ideally provides a stream of sequential particulate material and an outer sheath tube 32 which encompasses the entrance tube 30 and provides sheathing fluid. Likewise, on the other end of the measurement region 28, there is normally positioned an exit tube 34 having an orifice for receiving the stream of particulate material. Laminar fluid flow is maintained through the measurement region 28 by the introduction of the sheathing fluid, along with the creation of a differential pressure between the quiescent volume and the sheathing fluid and the sample cell flow. In the preferred embodiment the reflector chamber 12 is filled with a particulate-free liquid medium, although a chamber using a gaseous medium could be used with the present invention. The specific construction of the entraining means 26 which provides passage of the particulate material through the measurement 28 is of conventional design.

As depicted in FIG. 2, means for irradiating the particulate material with preferably a high intensity light beam, such as a laser excitation beam, is generally indicated by numeral 36. Irradiating means 36 includes a beam entrance orifice 38 and a beam exit orifice 40. Exteriorly positioned relative to the orifices 38 and 40 are, respectively, a beam source (not shown) and a beam dump (not shown) for emitting and disposing of the light beam. The two orifices 38 and 40 are aligned with each other so as to preferably, but not necessarily, allow the light beam passing therebetween to intersect orthogonally the flow of particulate material in the measurement region 28. As will become apparent hereinafter the light beam must approximately intersect the flow of particulate material at the primary focus 18 of the first reflector surface 14. It should be appreciated that although laser light is used to illustrate the operation of the preferred embodiments of the present invention, the particulate material could be impinged upon by other forms of radiant energy as will become more apparent hereinafter.

Although scattered light and fluorescent light are commonly collected, it should be understood that the present invention may also be used to collect other forms of radiant energy from particulate material. Consequently, the term "detectable radiation" may include any radiant energy which propagates in straight lines and undergoes specular reflection, such as light, infrared radiation and ultraviolet radiation. However, for the purposes of describing the preferred embodiments, scattered light and fluorescent light will be used as examples of detectable radiation.

In one type of analysis, the laser excitation beam is scattered by the particles so that most of the scattered light will deviate from and not be received by the beam exit orifice 40. Another analysis commonly used in the industry is to excite fluorescence as biological cells traverse the laser excitation beam. Fluorescent excitation is normally accomplished by staining the cells with a fluorescent dye and dispersing the cells into a suspension sufficiently dilute that the cells proceed one by one through the primary focus 18. In either case, there is typically scattered laser light and/or relatively weak fluorescent light, both which hereinafter will be termed "detectable radiation". Consequently, the interaction of the irradiating means 36 with the particulate material defines a source 42 of detectable radiation at the primary focus 18. The above described procedure of having a laser excitation beam intersect a sample stream of particulate material, possibly stained, at one of the foci of the ellipsoid is a well known procedure in the art.

Referring to FIG. 1, in operation the radiation collector apparatus 10 irradiates the particulate material stream to produce detectable radiation which emanates outward from the primary focus 18. The detectable radiation either proceeds directly through the window 24 as illustrated by ray R1 or is reflected one or more times off of the first reflector surface 14 and/or the second reflector surface 16 as illustrated by rays R2 and R3. As to the reflected detectable radiation, the number of reflections of a given ray will depend on which of the two reflector surfaces 14 or 16 the ray initially impinges upon after emanating from the primary focus 18, the position of the initial intersection of the given ray with the reflector surfaces 14 or 16, and the solid angle subtended by the window 24 relative to the primary focus 18.

Except for an insignificant amount of radiation to be discussed hereinafter, all rays exit directly or after an even number of reflections from the window 24 in such a direction that they seem to emanate from the primary focus 18. In the preferred embodiment of FIG. 1 the solid angles subtended by the second reflector surface 16 and the window 24 at the primary focus 18 are ideally but not necessarily equal. As illustrated by ray R2, almost all of the detectable radiation initially impinging upon the second reflector surface 16 after emanating from the primary focus 18 is reflected four times in the following sequence: reflected off the second reflector surface 16 once, then reflected off the first reflector surface 14 twice on opposed portions thereof, and finally reflected off the second reflector surface 16 for a second time to pass through primary focus 18 and exit through the window 24. As illustrated by ray R3, any ray which initially impinges upon the first reflector surface 14 is subsequently reflected off of the second reflector surface 16 so as to pass through the primary focus 18 and exit through the window 24. In summary, with the above described equal solid angles, rays initially impinging upon the first reflector surface 14 exit through the window 24 after two reflections and rays initially impinging upon the second reflector surface 16 are reflected four times before exiting through the window 24 in an organized manner. This organized radiation permits the use of techniques commonly used with convergent, divergent or collimated radiation, such as filtering out stray radiation with a pinhole, or the concentration of radiation in a collimated beam for more efficient use of the same by detector means. As previously referred to as an exception, there is an insignificant amount of reflected detectable radiation which impinges near the center of the second reflector surface 16 after emanating from the primary focus 18 which is reflected only once so as to bounce back to and exit out of the window 24 without further reflection and without proceeding through the primary focus 18.

It should be noted that in the preferred embodiment the window 24 subtending a solid angle equal to that of the second reflector surface 16 is merely a matter of design preference. There are certain design preferences which may suggest a larger or smaller window 24. For instance, if the window 24 is dimensioned to have a solid angle smaller than the solid angle of the second reflector surface 16, then some of the detectable radiation impinging initially on the first reflector surface 14 will be reflected more than twice while some of the detectable radiation impinging initially upon the second reflector surface 16 will be reflected more than four times. As illustrative of some factors to be considered, the disadvantage of more reflections, and therefore decrease in radiation intensity, must be weighed against the advantages of having a smaller collection angle for a lens 44 and a smaller center cone of disorganized radiation. Generally, too small of a window 24 would be undesirable due to the number of reflections. On the other hand, too large of a window is undesirable even though there are less reflections due to the radiation having to be collected over too wide of an angle relative to the primary focus 18. Lenses with f-numbers below approximately 0.7 are not easily available commercially. Consequently, the design considerations of loss of radiation intensity by reflection, the angle of collection of detectable radiation passing through the window 24 which desireably determines the eccentricity of the ellipsoid for a maximum of four reflections and other similar factors all dictate the size of the window 24, such sizing being considered to be merely a matter of design performance. Accordingly, variations in the size of the window 24 are considered to be within the scope of this invention.

In the practical application of the radiation collector apparatus 10, the foci 18 and 20 are actually focal zones and not theoretical points. In the preferred embodiments the intersection of the particulate material, which may be the width of several particles, with the laser beam may create a "sensing zone" of radiating radiation at the primary focus 18 having a volume of up to 10,000 cubic microns in the preferred embodiment. More specifically, the finite dimensions and somewhat diffused (Gaussian) distribution of radiation, convolved with the path of the particulate suspension, gives rise to this "sensing zone". This zone at the primary focus 18 is centered around a mathematical, infinitesimally small focal point and is represented in the drawings as a single point. As is well known in the art, a zone centered at the first focal point of the ellipsoid creates a corresponding zone of radiation centered at the second focal point of the ellipsoid. Although identified as a geometrical point for the purposes of illustration in the drawings, the term "focus" refers to a focal zone generally centered about an infinitisimally small focal point.

A distortion to the configuration of the first reflector surface 14 can be introduced and compensated for by correspondingly modifying the second reflector surface 16 with the use of numerical techniques to provide the same results of returning the reflected detectable radiation to the primary focus 18. Consequently, with the introduction of such distortions, both the first reflector surface 14 and the second reflector surface 16 would deviate from a precise ellipsoidal conic section configuration and planar configuration, respectively, but in combination would accomplish the same result. Also, the introduction of a relatively small distortion to the second reflector surface 16 produces a larger zone for the reflected detectable radiation at the primary focus 18. Such a larger zone is not particularly desirable, but in certain applications is tolerable. It should be understood that such mere changes in configuration as described in this paragraph are considered to be within the scope of this invention, and for this reason the claims of this application use the term "substantially" when referring to the configuration of the reflector surfaces 14 and 16.

Detector means (partially shown) is ordinarily positioned exterior to the reflector chamber 12 along the symmetry axis 22 for the conversion of detectable signals to electrical signals so as to provide subsequent data acquisition. The specific construction of the detector means with its associated optics for the preferred embodiments may be of many conventional designs well known to those skilled in the art. The detector means receives the detectable radiation and converts the detectable radiation into electrical signals to be used in a conventional pulse height analyzer or similar well known data acquisition device. For the preferred embodiments in which the detectable radiation comprises light the typical detector means would normally comprise a well known photosensitive detector, preferably in the form of photomultiplier tubes, vacuum photodiodes or solid state photodiodes and the like. Normally, although not necessarily, the detector means would include the collimating lens 44 for providing normal light to the photosensitive surfaces of the photosensitive detector as shown in FIG. 1. The more orthogonally that the organized beam arrives at the photosensitive surface of the photosensitive detector, the more efficiently the photosensitive detector will operate. In addition, an optional light color filter 46 may be included to separate fluorescent and scattered light which also operates more efficiently with normal light. In summary the collection of almost all of the detectable radiation into an organized diverging beam proceeding from the primary focus 18 allows for the more efficient use of optional light color filters, such as the filter 46, and the photosensitive detector. Additionally, this organized light also allows for the use of other optical techniques available for collimated, divergent, and convergent light, such as the incorporation of a pinhole aperture for filtering out stray light.

As previously described, in particle analysis detectable radiation, commonly either scattered light or fluorescent light, radiates outward from the primary focus 18 in distribution patterns known to those skilled in the art. As the radiation emanates outward from the primary focus 18 it may take any radial direction in an imaginary sphere centered about the primary 18. The solid angle subtended will be utilized in this application to relate to the reflector surface area which is lost for reflection of radiation emanating from the primary focus 18. The collection angle therefore is the total possible angle of radiation $4\pi$ steradians, minus the solid angles of lost radiation collection. As examples of items that result in loss of collection angle, the following items are exemplary, but not exclusive. First, the outer sheath tube and exit tube 32 and 34 respectively, along with beam entrance and exit orifices 38 and 40 respectively, creates four relatively small solid angles of loss. In the prior art devices, the largest solid angle of lost radiation created is with the conical light collector or its equivalent. However, except possibly for the center cone of reflected light previously described, there is no solid angle of lost radiation collection formed with the second reflector surface 16 of the present invention. Moreover, the relatively insignificant center cone of radiation which does not leave the window 24 in an organized manner is only lost if organized light is required. In the present invention the formation of a larger collection solid angle relative to those existing in the prior art ellipsoidal chambers, creates a greater radiation collection efficiency.

The present invention is useful if the detectable radiation comes from a source which is so small that it has negligible self-shadowing effects as the light passes through the primary focus 18 after the second or fourth (or other multiples of 2) reflection. It should be noted that with the analysis of particulate material, the particles normally are sufficiently small so that blockage of radiation passing through the primary focus 18 is relatively insignificant as in U.S. Pat. 3,989,381.

Figure 3:
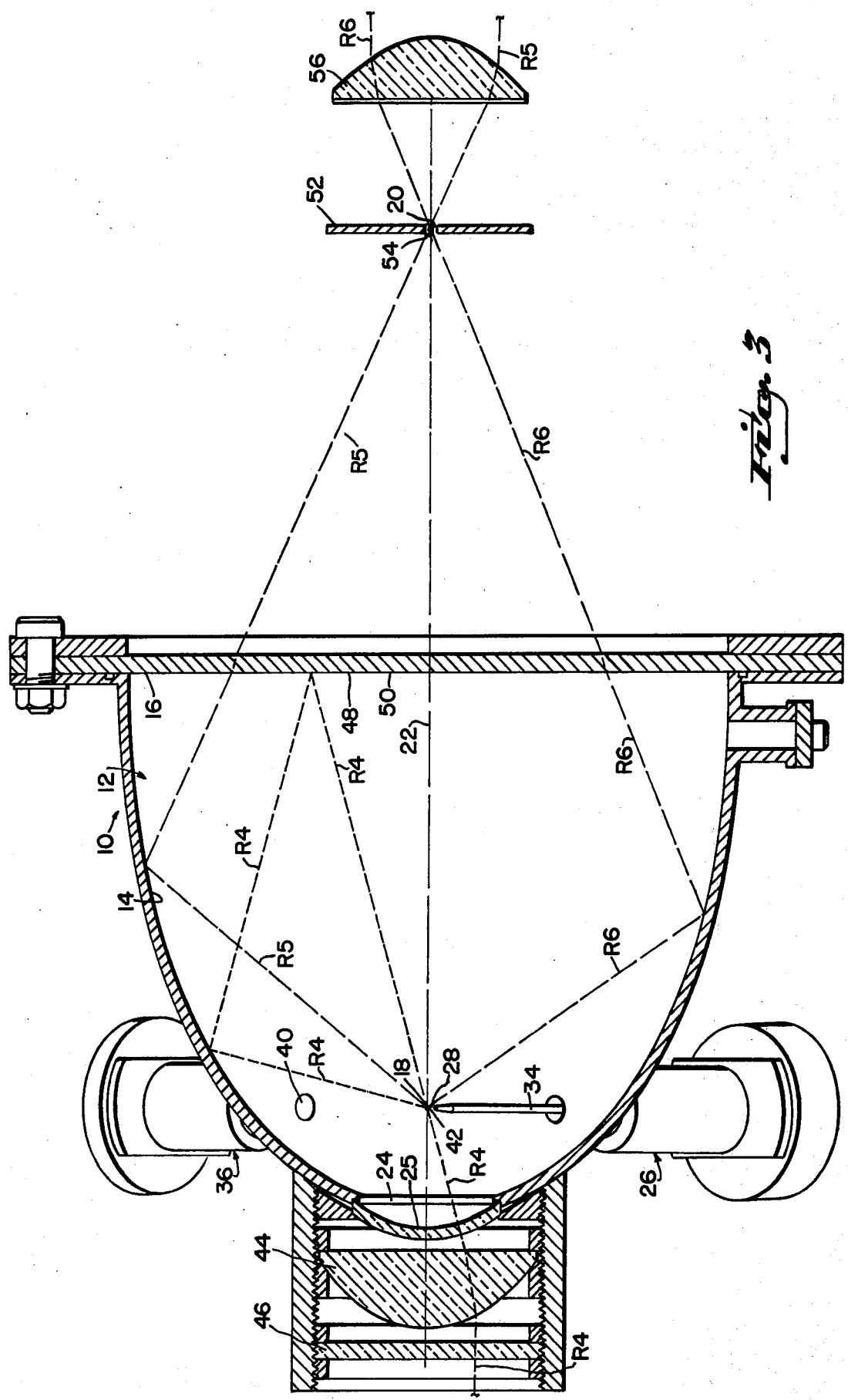
FIG. 3 is a cross-sectional view of an alternative embodiment of the radiation collector apparatus of the present invention with a dichroic planar second reflector surface taken along a plane passing through the major axis of the ellipsoidal first reflector surface.

With reference to FIG. 3 an optional variation of the present invention is to make the second reflector surface 16 a dichroic reflector 48 ideally comprising a mirror coated with a well known dichroic coating. This dichroic coating defines an inwardly facing dichroic surface 50, preferably on the front surface of the mirror which passes through only certain wavelengths of radiation. Ideally, for some applications in particle analysis, dichroic reflector 48 reflects incident fluorescent light rays, such as R4, and passes through incident scattered laser light rays, such as R5 and R6. However, the selection of those wavelengths to be passed through and those to be reflected are matters of design preference which will be dictated by the particular application for which the present invention is used. In the preferred embodiment of this variation, such an arrangement would permit most of the scattered laser light to converge toward the secondary focus 20. In that the scattered light forms an organized beam, various optical techniques which are usable with organized light may be optionally included. For instance, a wall 52 with a pinhole 54 may be optionally provided for filtering out stray light. In addition, a second collimating lens 56 may be included to provide normal light for a second detector means (not shown). Consequently, the scattered light and the fluorescent light are collected at opposed ends of the reflector chamber 12. By virtue of this design, various analyses commonly conducted in the industry which require the separation light of different wavelengths may be conducted. Although laser light and fluorescent light are the two types of light separated in the preferred use of the present invention, it should be understood that any two types of radiation capable of being separated by a dichroic coating are within the scope of this invention.

Figure 4:
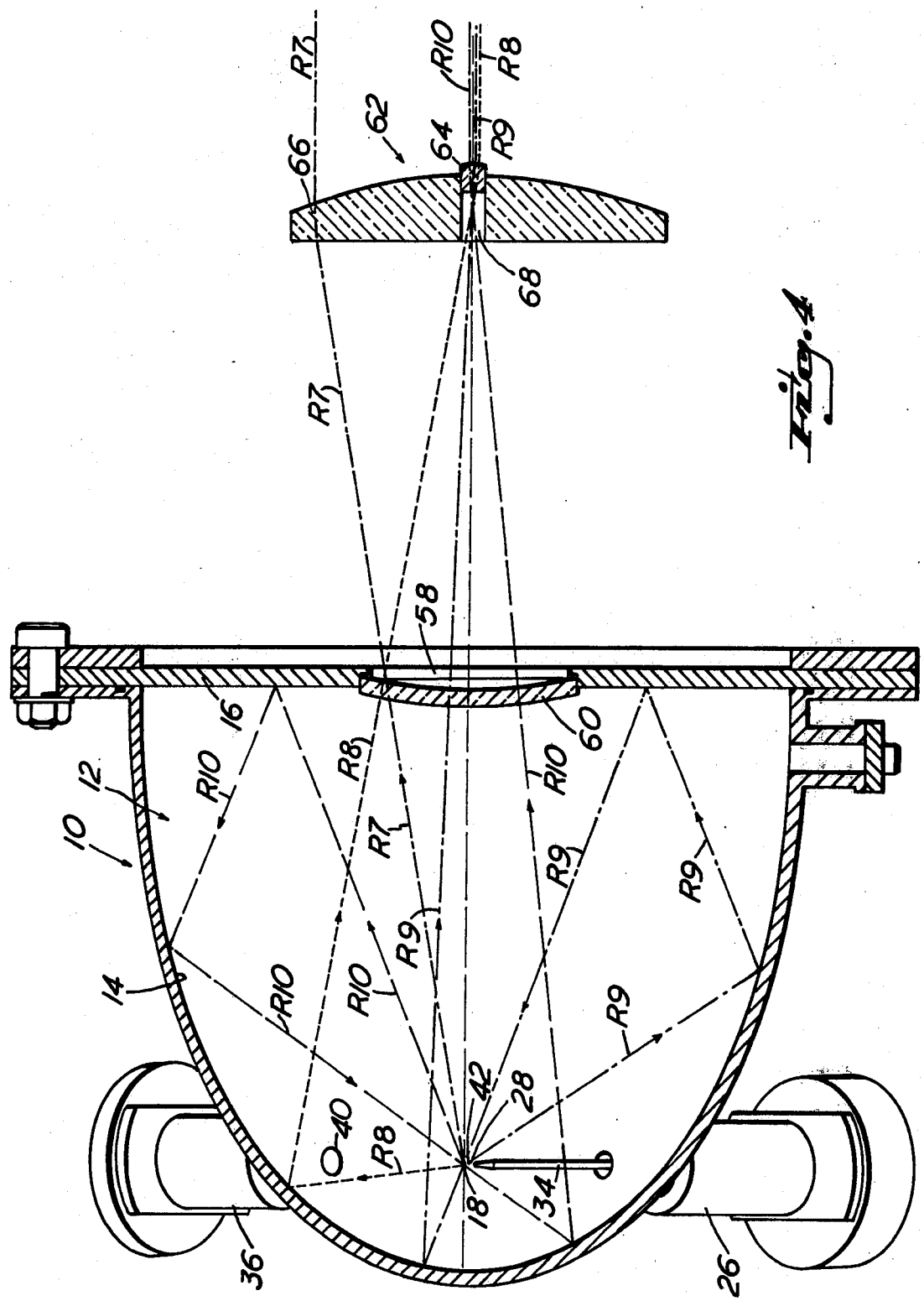
FIG. 4 is a cross-sectional view of another alternative embodiment of the present invention with a window formed in the second reflector surface taken along a plane passing through the major axis of the ellipsoidal first reflector surface.

As shown in FIG. 4, an alternative embodiment of the radiation collector 10 of the present invention is provided with a window 58 formed in the second reflector surface 16 so as to provide an exit for the detectable radiation. The window 58 is aligned in intersecting relationship with the symmetry axis 22, and in the preferred embodiment is centered thereon. In the preferred embodiment a confining window glass 60, preferably having a spherical configuration, retains the fluid in the reflector chamber 12. Depending upon the usage of the reflector chamber 12 with hydrosols or aerosols, it may or may not be desirable to have the window glass 60. Preferably, the window glass 60 has an inner and outer radii thereof having a center at the secondary focus 20 so as to allow most of the exiting radiation to pass orthogonally through its surfaces, minimizing intensity losses and refractive bending.

Referring to FIG. 4, in operation the radiation collector apparatus 10 provides for the detectable radiation to exit through the window 58 either directly as illustrated by ray R7 or after being reflected one or more times off of the second reflector surface 16 and/or the first reflector surface 14 as illustrated by rays R8, R9 and R10. As to the reflected detectable radiation, the number of reflections of a given ray will depend upon which of the two reflector surfaces 14 or 16 the ray initially impinges upon after emanating from the primary focus 18, the position of the initial intersection of the given ray with the reflector surface 14 or 16, and the solid angle subtended by the window 58 relative to the primary focus 18.

With reference to FIG. 4, except for a small amount of radiation to be discussed hereinafter, all rays exit after an odd number of reflections from the window 58 and in such a direction that they converge on the secondary focus 20. The small amount of radiation previously referred to exits from the window 58 after emanating from the primary focus 18 without reflection. This small amount of detectable radiation comprises a cone centered on the symmetry axis 22 which forms a solid angle at the primary focus 18 that is dependent upon the size of the window 58. As illustrated by ray R8, a portion of the detectable radiation which initially impinges upon the first reflector surface 14 passes through the window 58 after one reflection. As illustrated by ray R9, the remaining portion of the detectable radiation which emanates from the primary focus 18 and impinges upon the first reflector surface 14 passes through the window 58 after three reflections. As illustrated by ray R10, the detectable radiation which emanates from the primary focus 18 and impinges upon the second reflector surface 16 is reflected three times prior to passing through the window exit 58. The amount of detectable radiation which is reflected one time versus the amount that is reflected three times is dependent upon the size of the window 58. Moreover, if the window is made sufficiently smaller than that illustrated in FIG. 4, then some of the detectable radiation is reflected at least five times. Consequently the size of the window 58 as illustrated in FIG. 4 is merely a matter of design preference. For instance, a smaller window 58 provides for a narrower beam exiting from the same, but on the other hand, results in portions of the detectable radiation being reflected more times with its associated decrease in radiation intensity. This embodiment is particularly advantageous in that the window 58 can be dimensioned and configured such that a relatively narrow beam of radiation exits from the same. As previously described with the embodiment illustrated in FIG. 1, the organized radiation which converges on the secondary focus 20 permits the use of techniques commonly used with organized radiation.

As illustrated in FIG. 4, a lens arrangement 62 is optionally provided for the organization of substantially all of the detectable radiation exiting through the window 58. As previously described, there is a cone of detectable radiation which emanates directly through the window 58 which is not convergent upon the secondary focus 20, as illustrated by ray R7. The remainder of the detectable radiation converges on the secondary focus 20. The lens arrangement 62 comprises a pair of coaxial lenses, center lens 64 and peripheral lens 66 having a center aperture 68. In the preferred embodiment illustrated in FIG. 4, these two lenses 64 and 66 are offset relative to each other along the symmetry axis 22 while maintaining a coaxial relationship. However, the two lenses could have concentric centers with both lenses being located downstream relative to the secondary focus 20. Additionally, the lenses 62 and 64 which are incorporated in the present invention are ideally utilized to organize the radiation into a collimated beam. However, for some applications, it might be desirable to use such lenses so as to create a convergent or divergent beam on a common focus. But for the purpose of collecting light with photosensitive surfaces, orthogonal radiation is desirable. In the preferred embodiment of FIG. 4, to create the collimated beam, the peripheral lens 66 would have a focus at the primary focus 18, while the center lens 64 would have a focus at the secondary focus 20. However, it should be understood that any pair of coaxial lenses having foci, either actual or virtual, which results in the production of an organized beam of radiation from the radiation emanating from the primary focus 18 and also from radiation converging toward the secondary focus 20 is within the scope of the present invention. It should also be appreciated that in this embodiment, the detectable radiation enters the lenses 64 and 66 or any other lens substituted therefor at an angle not far from the normal.

The design of the various embodiments of the radiation apparatus 10 provides for greater collection efficiency for detectable radiation than the prior art collectors. This improved efficiency is primarily due to a substantially $4\pi$ steradian collection angle combined with the efficient usage of the radiation collected. Part of this efficient usage of the radiation collected lies in collecting radiation with the previously described wide angle relationship with a minimum of reflections and therefore lessening intensity losses. Yet another part of this efficient usage of the radiation collected includes maintaining an organized beam of collected radiation during the collection process so as to permit the utilization of conventional techniques commonly used with organized radiation. Examples of such techniques include providing a relatively orthogonal approach for the rays to the detector means and its associated light color filter for more efficient operation of the same. Additionally, organized radiation allows for the incorporation of a pinhole aperture for filtering out stray radiation. Moreover, it should be appreciated that light has a very broad spectrum; hence, reflectors are better than lenses which act as refractors of the collected light and therefore cause chromatic aberration.

Although particlar embodiments of the invention have been shown and described in full here, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

What is claimed is:

1. A radiation collector apparatus for analyzing particulate material wherein irradiation of the particulate material produces a source of detectable radiation, comprising:
   a reflector chamber having a first reflector surface and a second reflector surface,
   said first reflector surface substantially having a configuration of a half portion of an ellipsoid of revolution generated by rotating about a major axis of an ellipse a portion of the ellipse extending to and terminating at a minor axis of the ellipse,
   said first reflector surface having a primary focus and a secondary focus with said primary focus being positioned within said reflector chamber at the source of detectable radiation,
   said second reflector surface having a substantially planar configuration,
   said second reflector surface being positioned so that any position thereon is substantially disposed in equally spaced relationship to said primary focus and said secondary focus,
   a window formed in one of said reflector surfaces and aligned in intersecting relationship with a symmetry axis defined by said primary focus and said secondary focus,
wherein the detectable radiation emanating from the primary focus proceeds either directly or after one or more reflections through said window.

2. In the radiation collector apparatus of claim 1,
   means for irradiating the particulate material with light at said primary focus to produce detectable radiation deviating from the path of the irradiating light.

3. In the radiation collector apparatus of claim 2,
   said detectable radiation deviating from the path of the irradiating light comprising scattered light.

4. In the radiation collector apparatus of claim 2,
   said detectable radiation deviating from the path of the irradiating light comprising fluorescent light.

5. In the radiation collector apparatus of claim 2,
   means for passing the particulate material through said primary focus.

6. In the radiation collector apparatus of claim 5,
   detector means cooperatively positioned on the symmetry axis for receiving the detectable radiation.

7. In the radiation collector apparatus of claim 1,
   said window formed in said first reflector surface.

8. In the radiation collector apparatus of claim 7,
   said second reflector surface comprising a dichroic reflector.

9. In the radiation collector apparatus of claim 8,
   said dichroic reflector including a dichroic material capable of reflecting fluorescent light while allowing scattered light to pass therethrough.

10. In the radiation collector apparatus of claim 1,
   said window formed in said second reflector surface.

11. In the radiation collector apparatus of claim 10,
   a peripheral lens having a center aperture centered on said symmetry axis,
   a center lens centered on said symmetry axis.

12. In the radiation collector apparatus of claim 11,
   said peripheral lens and said center lens disposed in coaxial relationship relative to each other adjacent said secondary focus.

13. In the radiation collector apparatus of claim 12,
   said peripheral lens comprising a collimating lens having a focus at said primary focus,
   said center lens comprising a collimating lens having a focus at said secondary focus.

14. A method of collecting detectable radiation produced by the presence of particulate material, comprising the steps of:
   dividing the detectable radiation emanating from a primary focus of a first reflector surface having a half portion of an ellipsoid configuration into a first portion of detectable radiation emanating from the primary focus and impinging upon the first reflector surface and into a second portion of detectable radiation emanating from the primary focus in a solid angle subtended by the intersection of the first reflector surface and a planar second reflector surface positioned in a plane of all possible positions of a minor axis of the first reflector surface and impinging upon the second reflector surface, reflecting from the first reflector surface the first portion of the detectable radiation emanating from the primary focus so that the detectable radiation proceeds toward a secondary focus of the first reflector surface, reflecting that part of the first portion of the detectable radiation proceeding from the first reflector surface after one reflection and which impinges upon the second reflector surface off of the second reflector surface so that the same is convergent upon the primary focus, reflecting the second portion of the detectable radiation emanating from the primary focus off of a planar second reflector surface so that the detectable radiation subsequently reflects from the first reflector surface twice so as to be convergent upon the secondary focus, passing the reflected detectable radiation which has reflected at least once off of at least one of the reflector surfaces and unreflected detectable radiation through a window formed in one of the reflector surfaces.

15. In the method of claim 14,
positioning the window so as to be formed in the first reflector surface,
passing through the second reflector surface radiation having a predetermined wavelength range and reflecting radiation of all other wavelengths from the second reflector surface.

16. A method of collecting detectable radiation produced by the presence of particulate material, comprising the steps of:
dividing the detectable radiation into at least three portions,
reflecting from a first reflector surface having a half portion of an ellipsoid configuration detectable radiation comprising a first portion of the detectable radiation emanating from a primary focus of the first reflector surface so that the detectable radiation proceeds toward a second reflector surface having a planar configuration,
thereafter reflecting the first portion of the detectable radiation proceeding from the first reflector surface off of the second reflector surface so that the detectable radiation having been twice reflected proceeds toward and passes through the primary focus,
reflecting from a second reflector surface detectable radiation comprising a second portion of the detectable radiation emanating from the primary focus so that a substantial part of this detectable radiation subsequently reflects off of the first reflector surface twice,
thereafter reflecting the second portion of the detectable radiation which previously was reflected from the first reflector surface twice off of the second reflector surface for a second time so that the detectable radiation having been reflected four times proceeds toward and passes through the primary focus,
passing a third portion of the detectable radiation emanating from the primary focus through the first reflector surface without reflection.

17. In the method of claim 16,
providing a window dimensioned and configured so that no further reflections are required before the detectable radiation exits from the window.

18. In the method of claim 16,
providing a window so that further reflections are required before the detectable radiation exits from the window.

19. In the method of claim 16,
providing a window so that fewer reflections are required before the detectable radiation exits from the window.

20. In the method of claim 16,
passing through the second reflector surface radiation having a predetermined wavelength range and reflecting radiation of all other wavelengths from the second reflector surface.

21. A method of collecting detectable radiation produced by the presence of particulate material, comprising the steps of:
dividing the detectable radiation emanating from a primary focus of a first reflector surface having a half portion of an ellipsoid configuration into a first portion of detectable radiation emanating from the primary focus and impinging upon the first reflector surface and into a second portion of detectable radiation emanating from the primary focus in a solid angle subtended by the intersection of the first reflector surface and a planar second reflector surface positioned in a plane of all possible positions of a minor axis of the first reflector surface,
reflecting from the first reflector surface the first portion of detectable radiation emanating from the primary focus so that the detectable radiation proceeds toward the second reflector surface,
thereafter reflecting that part of the first portion of the detectable radiation proceeding from the first reflector surface after one reflection and impinging upon the second reflector surface off of the second reflector surface so that the detectable radiation having been twice reflected proceeds toward and passes through the primary focus so as to be reflected for a third time off of the first reflector surface,
passing the remaining part of the first portion of detectable radiation proceeding from the first reflector surface after one reflection directly through a window in the second reflector surface without further reflection,
reflecting from the second reflector surface the second portion of detectable radiation emanating from the primary focus so that a substantial part of the second portion of the detectable radiation subsequently reflects off of the first reflector surface twice,
passing the remaining part of the second portion of detectable radiation emanating from the primary focus through the window in the second reflector surface without reflection.

22. In the method of claim 21,
providing a window dimensioned and configured so that no further reflections are required before the detectable radiation exists from the window.

23. In the method of claim 21,
providing a window so that further reflections are required before the detectable radiation exits from the window.

24. In the method of claim 21,
providing a window so that fewer reflections are required before the detectable radiation exits from the window.

* * * * *

UNITED STATES PATENT AND TRADEMARK OFFICE
CERTIFICATE OF CORRECTION

PATENT NO. : 4,188,542

DATED : October 9, 1980

INVENTOR(S) : Walter R. Hogg; Albert Brunsting

It is certified that error appears in the above—identified patent and that said Letters Patent is hereby corrected as shown below:

Column 12, line 15, change "wherein" to --whereby--.
Column 14, line 59, change "exists" to --exits--.

Signed and Sealed this

Ninth Day of December 1980

[SEAL]

Attest:

SIDNEY A. DIAMOND

Attesting Officer

Commissioner of Patents and Trademarks